United States Patent
Kanoto (10) Patent No.: US 11,466,646 B2
(45) Date of Patent: Oct. 11, 2022

(54) GAS FUEL SUPPLY SYSTEM

(71) Applicant: Robert Bosch GmbH, Stuttgart (DE)

(72) Inventor: Yoshihiko Kanoto, Saitama (JP)

(73) Assignee: Robert Bosch GmbH, Stuttgart (DE)

( * ) Notice: Subject to any disclaimer, the term of this patent is extended or adjusted under 35 U.S.C. 154(b) by 43 days.

(21) Appl. No.: 17/223,199

(22) Filed: Apr. 6, 2021

(65) Prior Publication Data

US 2021/0317801 A1    Oct. 14, 2021

(30) Foreign Application Priority Data

Apr. 10, 2020 (JP) .............................. JP2020-070872

(51) Int. Cl.
*F02M 21/02* (2006.01)

(52) U.S. Cl.
CPC .................................. *F02M 21/023* (2013.01)

(58) Field of Classification Search
CPC ............. F02M 21/023; F02M 21/0242; F02M 21/0272; F02M 21/0293; F02D 19/0613; F02D 19/0623; F02D 19/0642; F02D 19/0681; F02D 19/025; Y02T 10/30
See application file for complete search history.

(56) References Cited

U.S. PATENT DOCUMENTS

| | | | | |
|---|---|---|---|---|
| 7,191,768 B2* | 3/2007 | Tokunaga | ............. | F02D 19/022 123/527 |
| 7,467,622 B2* | 12/2008 | Tokunaga | .......... | F02M 21/0239 123/527 |
| 2001/0032628 A1* | 10/2001 | Goto | .................. | F02M 21/0242 123/529 |
| 2006/0054144 A1* | 3/2006 | Tokunaga | ............. | F02D 19/022 123/527 |
| 2007/0157909 A1* | 7/2007 | Tokunaga | ............. | F02D 19/022 123/527 |

FOREIGN PATENT DOCUMENTS

| | | |
|---|---|---|
| JP | 2003193874 A | 7/2003 |
| JP | 2009203944 A | 9/2009 |

* cited by examiner

*Primary Examiner* — Sizo B Vilakazi
(74) *Attorney, Agent, or Firm* — Michael Best & Friedrich LLP (57) ABSTRACT

A gas fuel supply system for supplying the gas fuel via an opening of an intake supply pipe that is connected to a combustion chamber in an engine operable in each of a gas fuel combustion mode and an oil fuel combustion mode includes: the gas fuel supply valve for regulating an amount of the gas fuel, the gas fuel supply valve having plural gas supply holes, from which the gas fuel is fed in a direction toward the opening when the valve is opened; and an opening regulation valve provided between the gas fuel supply valve and the opening and having an opening hole, an opening area of which can be regulated. The gas fuel supply system is configured that extended axes of all the gas supply holes pass through the fully opened opening hole.

8 Claims, 9 Drawing Sheets

GAS FUEL SUPPLY SYSTEM

BACKGROUND OF THE INVENTION

The present invention relates to a gas fuel supply system for supplying gas fuel to an intake supply pipe that leads to a combustion chamber in an engine operable in each of a gas fuel combustion mode and an oil fuel combustion mode.

Conventionally, an engine operable in each of a gas fuel combustion mode and an oil fuel combustion mode has been known. It is disclosed in JP-A-2003-193874 that, when gas fuel is supplied to such an engine, the gas fuel is supplied to an intake supply pipe via a gas fuel supply pipe and a gas fuel supply valve, and mixed gas in which the gas fuel and intake air are mixed is supplied to a combustion chamber in the engine.

It is disclosed in JP-A-2009-203944 that the intake air possibly leaks into the gas fuel supply pipe from the gas fuel supply valve while the engine is operated in the oil fuel combustion mode. In other words, in the oil fuel combustion mode, a pressure in the gas fuel supply pipe possibly becomes lower than a pressure in the intake supply pipe. It is thus described that, due to the pressure drop, the intake air in the intake supply pipe possibly pushes up a valve body of the gas fuel supply valve, the intake air possibly flows into the gas fuel supply pipe from the gas fuel supply valve, and moisture in the intake air possibly corrode the gas fuel supply pipe. It is disclosed in JP-A-2009-203944 that, as a countermeasure thereagainst, a shutoff valve (see FIG. 7 of JP-A-2009-203944) is attached to a branch pipe on an upstream side or a downstream side of the gas fuel supply valve.

Figure 16:
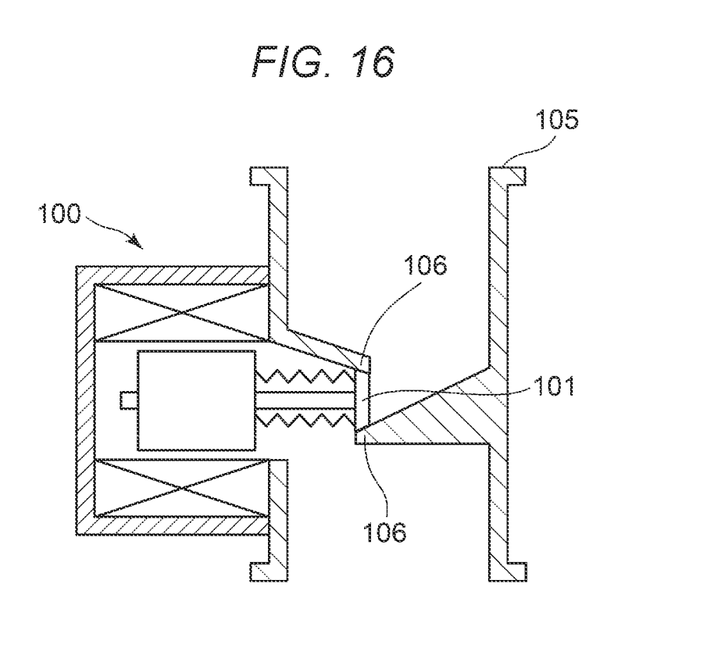
FIG. 16 illustrates a shutoff valve used in the related art.

FIG. 16 of the present application shows a similar prior art shutoff valve. The shutoff valve 100 is an electromagnetic valve that has a valve body 101 at a tip. A valve seat 106 is formed such that the valve body 101 can be seated thereon, and the shutoff valve 100 is attached to a side surface of a gas fuel supply pipe 105 in which the valve seat 106 is provided. When the shutoff valve 100 is not energized, the valve body 101 is seated on the valve seat 106 and shuts off a gas channel. Meanwhile, when the shutoff valve 100 is energized, the valve body 101 separates from the valve seat 106 and opens up the gas channel.

However, in the case where the shutoff valve 100 is provided on the upstream side of the gas fuel supply valve, the moisture and contaminants in the intake air possibly enter and corrode the gas fuel supply valve.

Figure 17:
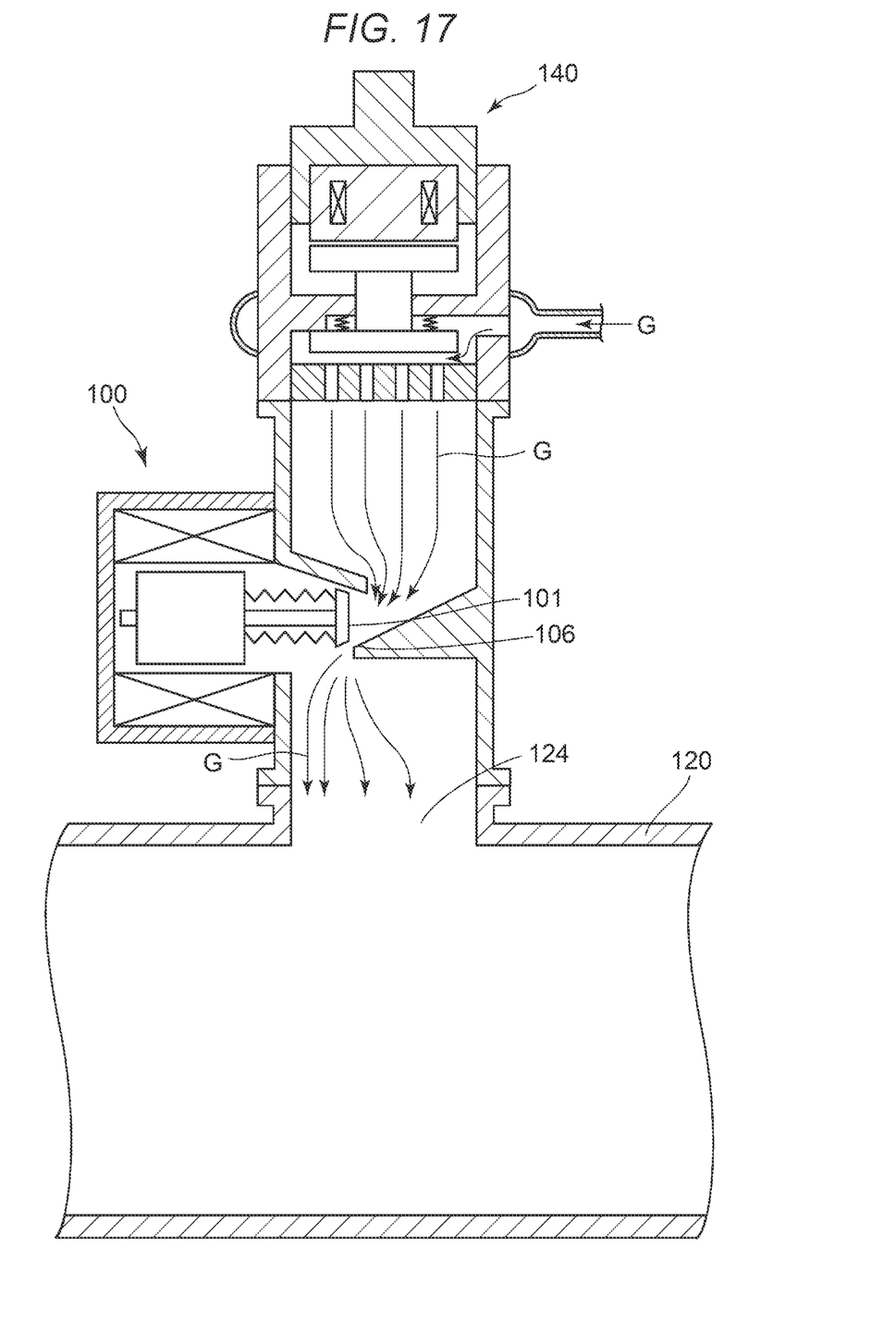
FIG. 17 is a cross-sectional view in an axial direction in which the shutoff valve used in the related art is provided on a downstream side of a gas fuel supply valve.

FIG. 17 of the present application is a schematic view of a prior art shutoff valve 100 provided on a downstream side of a gas fuel supply valve 140. The shutoff valve 100 is provided in a passage from the downstream side of the gas fuel supply valve 140 to an opening 124 of an intake supply pipe 120. In this case, gas fuel G that leaves the gas fuel supply valve 140 has to flow through a narrow valve section, and a pressure thereof drops in this valve section. Thus, it is impossible to appropriately control the gas fuel to be supplied to the intake supply pipe by the gas fuel supply valve 140.

SUMMARY OF THE INVENTION

The present invention has been made in view of the above problem, and therefore has a purpose of providing a gas fuel supply system capable of preventing inflow of intake air into a gas fuel supply pipe and a gas fuel supply valve and capable of supplying an appropriate amount of gas from the gas fuel supply valve to an intake supply pipe at appropriate timing in a state where a pressure drop caused by a throttle on a downstream side of the gas fuel supply valve is absent.

According to the present invention, a gas fuel supply system for supplying gas fuel via an opening of an intake supply pipe that is connected to a combustion chamber in an engine operable in each of a gas fuel combustion mode and an oil fuel combustion mode is provided. The gas fuel supply system includes: a gas fuel supply valve for regulating the gas fuel, the gas fuel supply valve having plural gas supply holes, from which the gas fuel is fed in a direction toward the opening when the valve is opened; and an opening regulation valve provided between the gas fuel supply valve and the opening and having an opening hole, an opening area of which can be regulated. The gas fuel supply system is configured that extended axes of all the gas supply holes pass through the fully opened opening hole.

The opening area of the opening hole can preferably be regulated at least in three stages at a fully closed position, a fully opened position, and a position therebetween.

The opening regulation valve is preferably any of an iris valve, a slide valve, and a butterfly valve.

The opening regulation valve preferably cooperates with the gas fuel supply valve to regulates an amount of the gas fuel to be supplied to the opening.

When the engine is switched from the gas fuel combustion mode to the oil fuel combustion mode, the gas fuel supply valve is first closed, and then the opening hole of the opening regulation valve is fully closed.

As it has been described so far, the present invention can provide the gas fuel supply system capable of preventing entry of the intake air into the gas fuel supply pipe and the gas fuel supply valve and capable of supplying the appropriate amount of gas from the gas fuel supply valve to the intake supply pipe at appropriate timing in a state where a pressure drop caused by a throttle on a downstream side of the gas fuel supply valve is absent.

DETAILED DESCRIPTION

A detailed description will hereinafter be made on a preferred embodiment of the present invention with reference to the accompanying drawings. The following embodiment merely illustrates one aspect of the present invention and thus does not limit the present invention. The embodiment can arbitrarily be changed within the scope of the present invention. In the present specification and the drawings, components having substantially the same functional configuration will be denoted by the same reference sign, and thus a description thereon will not be repeated.

(Overall Configuration Example of Engine in which Gas Fuel Supply System According to this Embodiment is Used)

Figure 1:
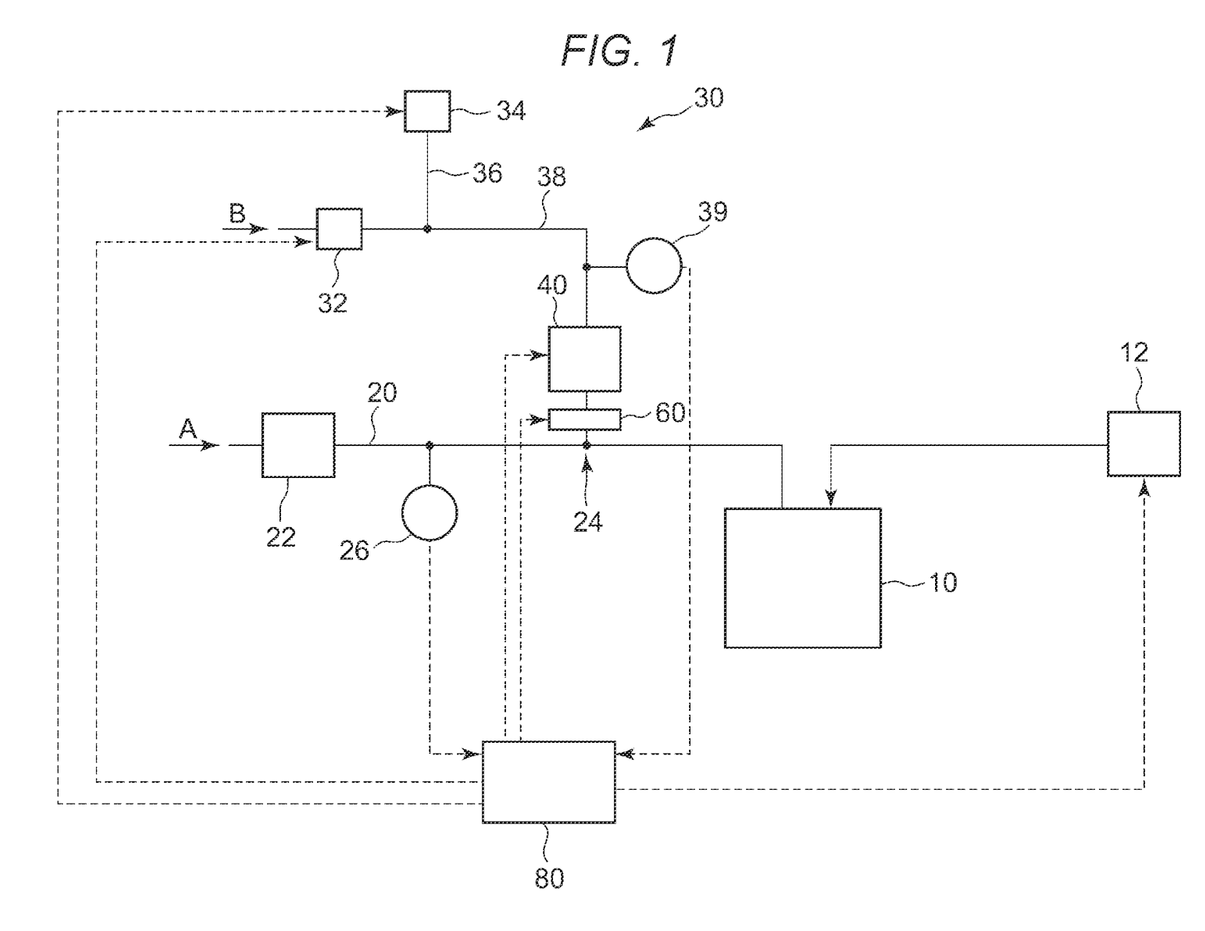
FIG. 1 is a schematic view of a gas fuel supply system according to this embodiment and an engine operable in each of a gas fuel combustion mode, in which the gas fuel supply system is used, and an oil fuel combustion mode.

FIG. 1 is a schematic view of a gas fuel supply system 30 according to this embodiment and an engine 10 operable in each of a gas fuel combustion mode, in which the gas fuel supply system 30 is used, and an oil fuel combustion mode.

In FIG. 1, intake air is supplied in an arrow A direction. The intake air is first pressurized in a supercharger 22, then flows through an intake supply pipe 20, and flows into the engine 10. The supercharger 22 increases a pressure of the intake air up to approximately 10 atm (an absolute pressure). An opening 24 is provided in an intermediate portion of the intake supply pipe 20. Via this opening 24, gas fuel is supplied by the gas fuel supply system 30. The gas fuel that has been supplied to the intake supply pipe 20 is mixed with the intake air and supplied to the engine 10. In addition, an intake supply pipe internal pressure sensor 26 is provided to a portion on a downstream side of the supercharger 22 in the intake supply pipe 20, and measures an internal pressure of the intake supply pipe 20.

As illustrated in FIG. 1, the gas fuel supply system 30 includes, as primary components, an on-off valve 32, a gas fuel supply pipe 38, a pressure release pipe 36, a pressure release valve 34, a gas fuel supply valve 40, and an opening regulation valve 60. In the gas fuel supply system 30, the gas fuel is supplied in an arrow B direction to the gas fuel supply pipe 38. A pressure of the gas fuel to be supplied (a supplied gas fuel pressure) is regulated to such a pressure that exceeds an intake pressure approximately by 3 atm at a maximum.

The on-off valve 32 is provided on an upstream side of the gas fuel supply pipe 38. When the on-off valve 32 is closed, supply of the gas fuel to the gas fuel supply pipe 38 is shut off. When the on-off valve 32 is opened, the gas fuel starts being supplied to the gas fuel supply pipe 38.

On a downstream side of the on-off valve 32, the pressure release pipe 36 is branched from the gas fuel supply pipe 38. In the pressure release pipe 36, a tip on an opposite side from the branch is provided with the pressure release valve 34. When the pressure release valve 34 is opened, the pressure release pipe 36 communicates with a low-pressure section, and gas fuel pressures in the gas fuel supply pipe 38 and the like are dropped. A portion on a downstream side of the branch in the gas fuel supply pipe 38 communicates with the gas fuel supply valve 40.

When the engine 10 is operated in the gas fuel combustion mode, the on-off valve 32 is opened, and the pressure release valve 34 is closed. Thus, the gas fuel is introduced into the gas fuel supply valve 40 through the gas fuel supply pipe 38. A pressure in the gas fuel supply valve 40 becomes equal to the supplied gas fuel pressure. Meanwhile, when the gas fuel combustion mode is switched to the oil fuel combustion mode, the on-off valve 32 is closed, and the pressure release valve 34 is opened. Thus, the pressure in the gas fuel supply pipe 38 and the gas fuel supply valve 40 is dropped. After the pressure drop, the pressure release valve 34 is closed.

The opening regulation valve 60 is provided on a downstream side of the gas fuel supply valve 40 and an upstream side of the opening 24 in the intake supply pipe 20. The opening regulation valve 60 has an opening hole, an opening area of which can be regulated. The opening hole constitutes a part of a passage from an outlet side of the gas fuel supply valve 40 to the opening 24 in the intake supply pipe 20. In addition, a gas fuel pressure sensor 39 is provided to the gas fuel supply pipe 38. The gas fuel pressure sensor 39 measures the pressure in the gas fuel supply pipe 38.

An electronic control unit 80 controls driving of the gas fuel supply valve 40, the opening regulation valve 60, the on-off valve 32, and the pressure release valve 34. In addition, signals from the intake supply pipe internal pressure sensor 26 and the gas fuel pressure sensor 39 are sent to the electronic control unit 80.

An oil fuel supply system 12 supplies oil fuel, for example, diesel fuel to the engine 10. In this case, the engine 10 is a diesel engine. The oil fuel supply system 12 is a fuel supply system such as a common rail, for example. The oil fuel supply system 12 is controlled by the electronic control unit 80.

(Gas Fuel Supply Valve)

Figure 2:
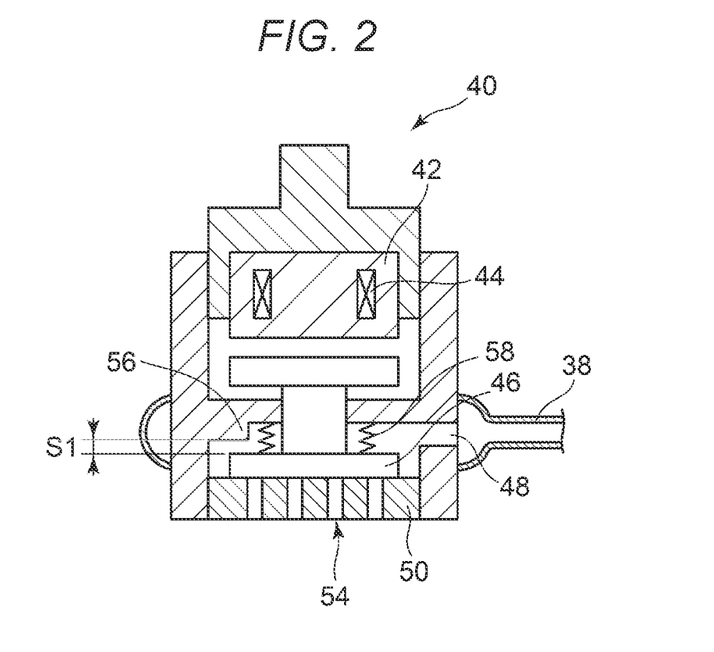
FIG. 2 is a schematic view of a gas fuel supply valve (closed).
Figure 3:
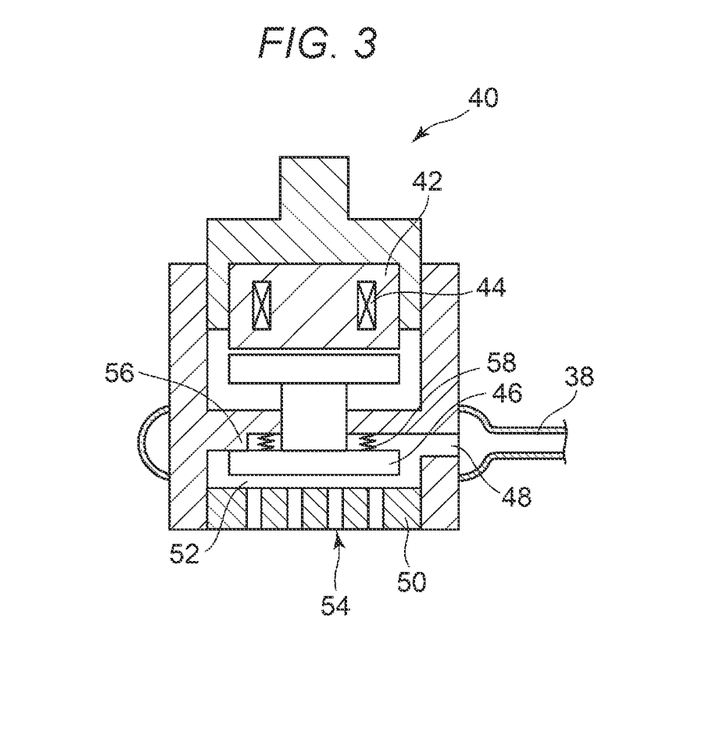
FIG. 3 is a schematic view of the gas fuel supply valve (opened).

FIG. 2 and FIG. 3 illustrate an exemplary configuration of the gas fuel supply valve 40. The gas fuel supply valve 40 is an electromagnetic valve and includes an electromagnetic coil 44 in a stator 42. A movable plate 46 is arranged in a vertically movable manner in the gas fuel supply valve 40. A fixed plate 50 is arranged below the movable plate 46 and is provided with plural gas supply holes 54. The movable plate 46 and the fixed plate 50 constitute a valve and a valve seat, respectively.

When an electromagnetic force is generated to the electromagnetic coil 44, the movable plate 46 moves upward and separates from the fixed plate 50. As a result, a clearance 52 is generated between the movable plate 46 and the fixed plate 50, and a channel for the gas fuel that runs through the clearance 52 and the plural gas supply holes 54 provided to the fixed plate 50 and is connected to a lower side of the fixed plate 50 is formed. This corresponds to a so-called open state of the gas fuel supply valve 40 (FIG. 3). Meanwhile, when the electromagnetic force is no longer generated, the movable plate 46 is pushed down by a spring 58 and is seated on the fixed plate 50. This corresponds to a so-called closed state of the gas fuel supply valve 40 (FIG. 2). A stopper 56 is provided to prevent direct contact of the movable plate 46 with the stator 42.

A gas fuel introduction hole 48 is provided around the gas fuel supply valve 40. The gas fuel introduction hole 48 is coupled to the gas fuel supply pipe 38. When the engine 10 is operated in the gas fuel combustion mode, the gas fuel is introduced into the gas fuel supply valve 40 from the gas fuel introduction hole 48 through the gas fuel supply pipe 38. The pressure in the gas fuel supply valve 40 becomes equal to the supplied gas fuel pressure. Meanwhile, when the engine 10 is switched from the gas fuel combustion mode to the oil fuel combustion mode, the on-off valve 32 is closed, and the pressure release valve 34 is opened. Thus, the pressure in the gas fuel supply pipe 38 and the gas fuel supply valve 40 is dropped.

When the gas fuel supply valve 40 is closed during the operation in the gas fuel combustion mode, the movable plate 46 is pressed against the fixed plate 50 by the supplied gas fuel pressure in addition to an elastic force of the spring 58. Meanwhile, when the gas fuel supply valve 40 is closed during the operation in the oil fuel combustion mode, the pressure in the gas fuel supply valve 40 is dropped. Thus, a pressure for pressing the movable plate 46 against the fixed plate 50 is also dropped. Just as described, during the operation in the oil fuel combustion mode, a force (a valve closing force) that presses the movable plate 46 in a valve closing direction is smaller than the valve closing force during the operation in the gas fuel combustion mode. Thus, in the case where the pressure on the outlet side of the gas fuel supply valve 40 is increased during the operation in the oil fuel combustion mode, there is a possibility that the closed state of the gas fuel supply valve 40 can no longer be maintained.

(Opening Regulation Valve)

The opening regulation valve 60 is provided to the passage from the outlet side of the gas fuel supply valve 40 to the opening 24 in the intake supply pipe 20. The opening regulation valve 60 has an opening hole 61, an opening area of which can be regulated. The opening area of the opening hole 61 is regulated by the electronic control unit 80. The opening area of the opening hole 61 can be changed at least in three stages at a fully closed position, a fully opened position, and a position therebetween or can continuously be changed from 0% (fully closed) to 100% (fully opened). The opening hole 61 constitutes a part of the passage from the outlet side of the gas fuel supply valve 40 to the opening 24 in the intake supply pipe 20.

Figure 4:
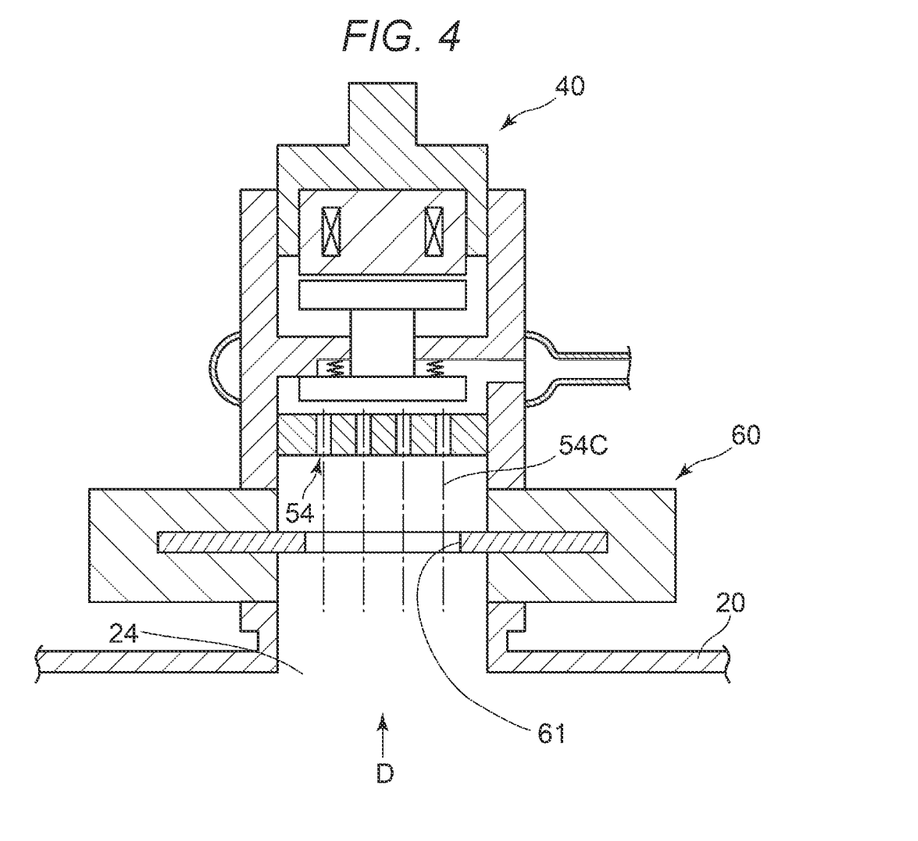
FIG. 4 is a cross-sectional view in an axial direction in which an opening regulation valve is attached on a downstream side of the gas fuel supply valve.
Figure 5:
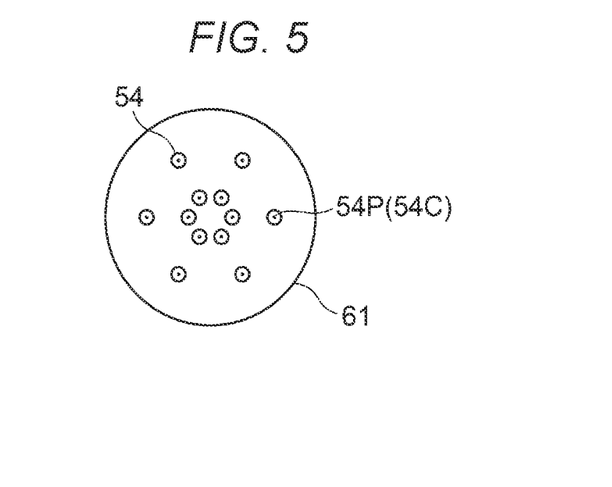
FIG. 5 is a view in which an opening hole is seen in a direction D in FIG. 4.

FIG. 4 is a cross-sectional view in the axial direction in which the opening regulation valve 60 is attached on the downstream side of the gas fuel supply valve 40 and the upstream side of the opening 24 and in which the opening hole 61 is fully opened. Each of the gas supply holes 54 is formed in a cylindrical shape, and an extended axis 54C is a straight line (a one-dot chain line in FIG. 4) that includes a center axis of the gas supply hole 54 and is extended therefrom. FIG. 5 is a view in which the opening hole 61 is seen in a direction D in FIG. 4. A point 54P is an intersection of a plane on the opening 24 side with the extended axis 54C in the opening hole 61. It is configured that the extended axes 54C of all the gas supply holes 54 pass through the fully opened opening hole 61. In this embodiment, the 12 gas supply holes 54 are provided. However, the number of the gas supply holes 54 is not limited thereto.

The opening regulation valve 60 is attached on the downstream side of the gas fuel supply valve 40. Thus, in the case where the opening hole 61 is fully opened in the gas fuel combustion mode, a flow of the gas fuel is not blocked between the gas supply holes 54 and the opening 24. Thus, by controlling the gas fuel supply valve 40, an appropriate amount of the gas fuel can be supplied to the intake supply pipe 20 at appropriate timing. In addition, even in the case where the pressure in the intake supply pipe 20 becomes higher than the pressure in the gas fuel supply valve 40 in the oil fuel combustion mode, the intake air does not flow into the gas fuel supply valve 40 and the gas fuel supply pipe 38 by fully closing the opening hole 61. Thus, there is no possible corrosion of the gas fuel supply pipe 38 and the gas fuel supply valve 40 caused by the moisture and the contaminants in the intake air.

For example, an iris valve 64, a slide valve 68, or a butterfly valve 72 is used as the opening regulation valve 60. A description will hereinafter be made on each of the valves.

(Iris Valve)

Figure 6:
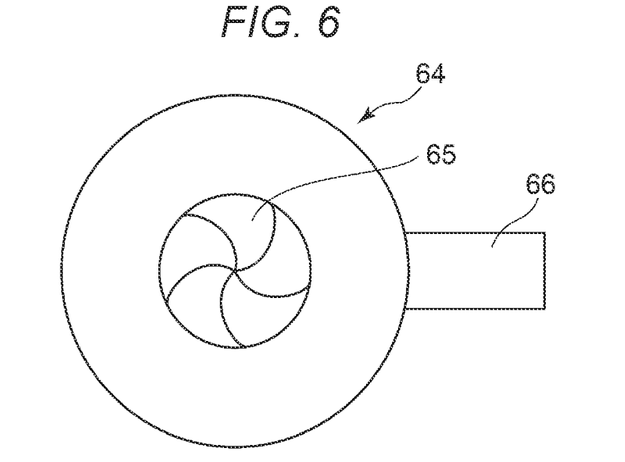
FIG. 6 is a schematic view of an iris valve (fully closed).
Figure 7:
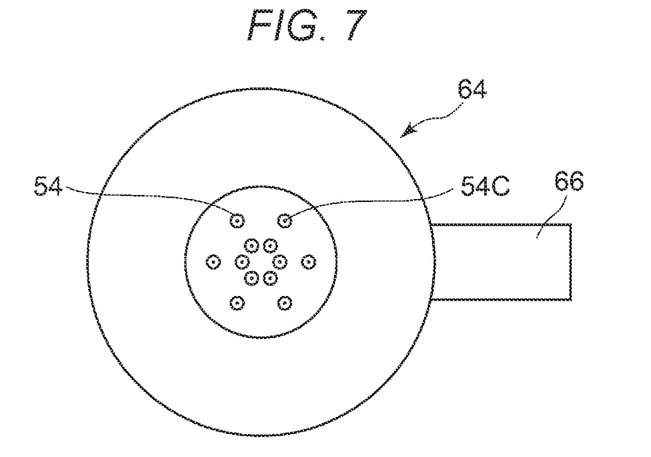
FIG. 7 is a schematic view of the iris valve (fully opened).
Figure 8:
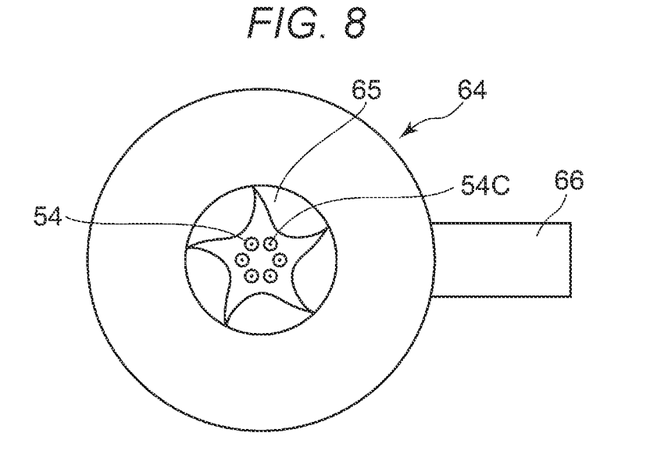
FIG. 8 is a schematic view of the iris valve (intermediately opened).

A description will be made on an example of the iris valve 64. Each of FIG. 6 to FIG. 8 is a view in which the iris valve 64 as the opening regulation valve is attached on the downstream side of the gas fuel supply valve 40 and the iris valve 64 is seen from a lower side in the axial direction (an arrow E direction in FIG. 9). The iris valve 64 in this example has an electronically-controlled iris valve actuator 66 and plural thin plates 65 that are coupled to the iris valve actuator 66 by a link mechanism or the like. The iris valve 64 is configured to have an opening hole, an opening area of which is changed when the iris valve actuator 66 moves the plural thin plates 65.

FIG. 6 is a view of a case where the opening area of the opening hole is 0%, that is, the opening hole is fully closed. FIG. 7 is a view of a case where the opening area of the opening hole is 100%, that is, the opening hole is fully opened. It is configured that the extended axes 54C of all the gas supply holes 54 pass through inside of the opening hole. FIG. 8 is a view of a case where the opening area of the opening hole is between 0% and 100% and is approximately 50%, for example. It is configured that half the extended axes 54C of the gas supply holes 54 pass through the inside of the opening hole. Just as described, the iris valve actuator 66 can reduce the opening area of the opening hole by moving the plural thin plates 65 in a center direction. On the contrary, the iris valve actuator 66 can increase the opening area of the opening hole by moving the plural thin plates 65 in a direction away from the center direction. The opening area of the opening hole in the iris valve 64 can be changed at least in three stages at a fully closed position, a fully opened position, and a position therebetween or can continuously be changed from 0% to 100%.

Figure 9:
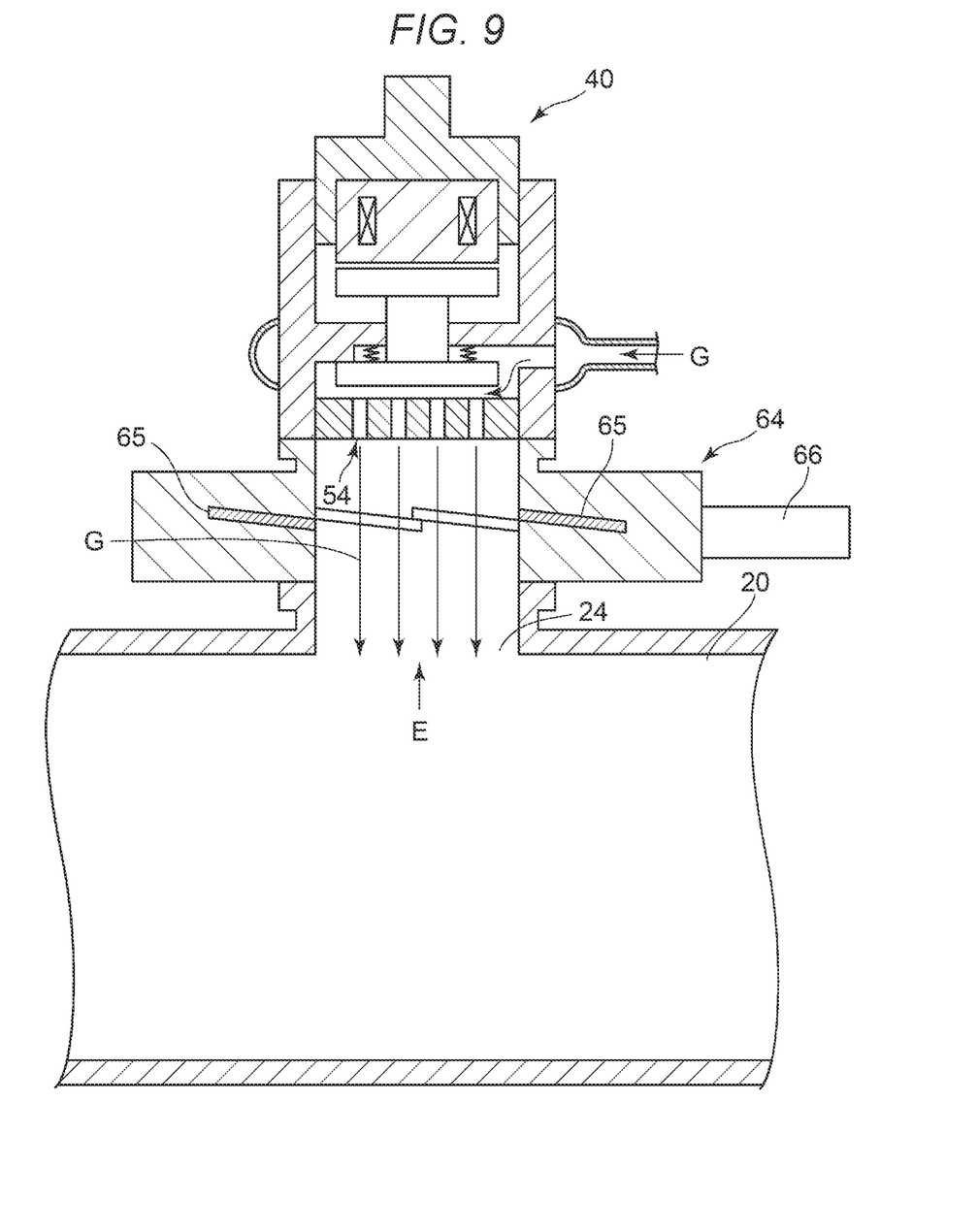
FIG. 9 is a cross-sectional view in the axial direction in which the iris valve is attached on a downstream side of the gas fuel supply valve.

FIG. 9 is a cross-sectional view in the axial direction in which this iris valve 64 as the opening regulation valve is attached on the downstream side of the gas fuel supply valve 40 and the upstream side of the opening 24. FIG. 9 illustrates a fully opened state of the iris valve. The iris valve can be formed to be vertically thin due to a structure thereof. Thus, a distance from the gas fuel supply valve 40 to the opening 24 becomes short. When the opening hole is fully opened in the gas fuel combustion mode, a flow G of the gas fuel is not blocked between the gas supply holes 54 and the opening 24. Thus, the appropriate amount of the gas fuel can be supplied to the intake supply pipe 20 at the appropriate timing by controlling the gas fuel supply valve 40 without dropping the pressure. In the oil fuel combustion mode, the entry of the intake air into the gas fuel supply valve 40 can be prevented by fully closing the iris valve 64.

(Slide Valve)

Figure 10:
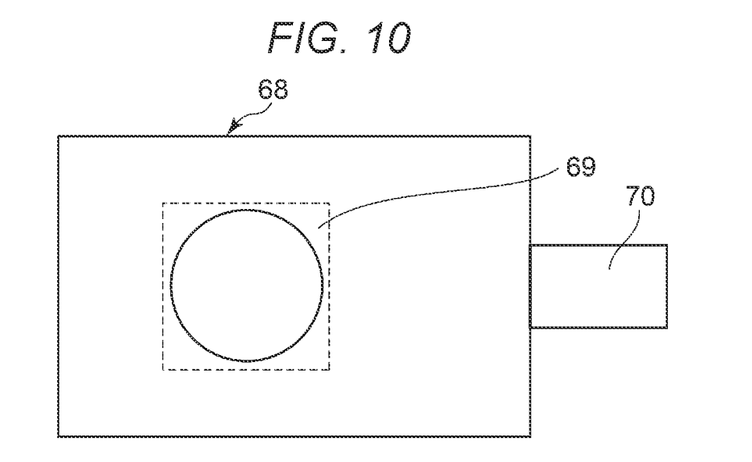
FIG. 10 is a schematic view of a slide valve (fully closed).
Figure 11:
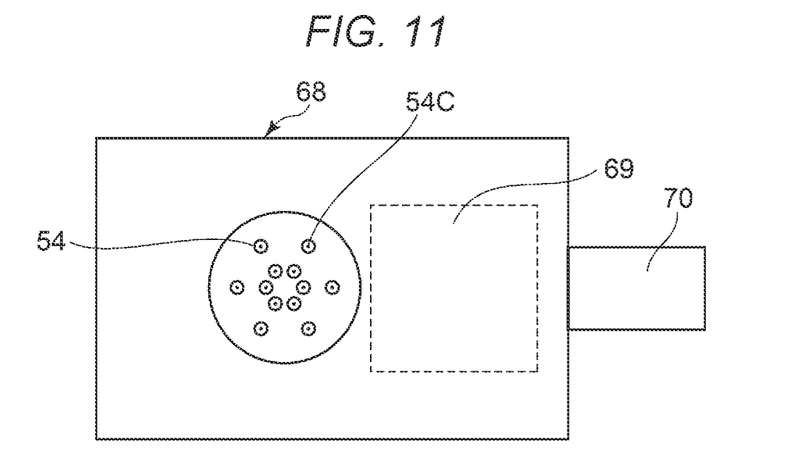
FIG. 11 is a schematic view of the slide valve (fully opened).
Figure 12:
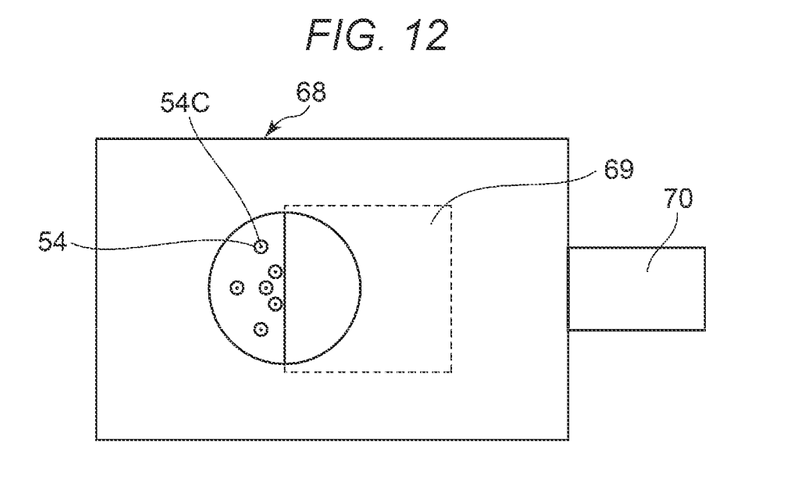
FIG. 12 is a schematic view of the slide valve (intermediately opened).

A description will be made on an example of the slide valve 68. Each of FIG. 10 to FIG. 12 is a view in which the slide valve 68 as the opening regulation valve is attached on the downstream side of the gas fuel supply valve 40 and the slide valve 68 is seen from the lower side in the axial direction (the arrow E direction in FIG. 9). The slide valve 68 in this example has an electronically-controlled slide valve actuator 70 and a thin slide plate 69 that is coupled to the slide valve actuator 70 by a link mechanism or the like. The slide valve 68 is configured to have an opening hole, an opening area of which is changed when the slide valve actuator 70 moves the thin slide plate 69.

FIG. 10 is a view of a case where the opening area of the opening hole is 0%, that is, the opening hole is fully closed.

FIG. 10 is a view of a case where the opening area of the opening hole is 100%, that is, the opening hole is fully opened. It is configured that the extended axes 54C of all the gas supply holes 54 pass through the inside of the opening hole. FIG. 11 is a view of a case where the opening area of the opening hole is between 0% and 100% and is approximately 50%, for example. It is configured that approximately half the extended axes 54C of the gas supply holes 54 pass through the inside of the opening hole. Just as described, the slide valve actuator 70 can reduce the opening area by moving the thin slide plate 69 in one direction, and can increase the opening area by moving the thin slide plate 69 in a reverse direction. The opening area of the opening hole in the slide valve 68 can be changed at least in three stages at a fully closed position, a fully opened position, and a position therebetween or can continuously be changed from 0% to 100%.

The slide valve 68 can be formed to be vertically thin due to a structure thereof. Thus, the distance from the gas fuel supply valve 40 to the opening 24 becomes short. When the opening hole is fully opened in the gas fuel combustion mode, the flow G of the gas fuel is not blocked between the gas supply holes 54 and the opening 24. Thus, the appropriate amount of the gas fuel can be supplied to the intake supply pipe 20 at the appropriate timing by controlling the gas fuel supply valve 40 without dropping the pressure. In the oil fuel combustion mode, the entry of the intake air into the gas fuel supply valve 40 can be prevented by fully closing the slide valve 68.

(Butterfly Valve)

Figure 13:
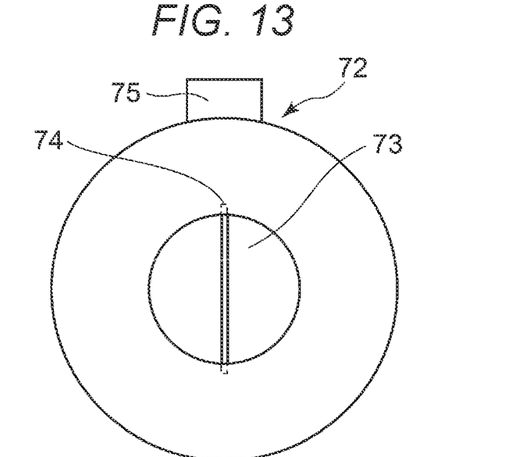
FIG. 13 is a schematic view of a butterfly valve (fully closed).
Figure 14:
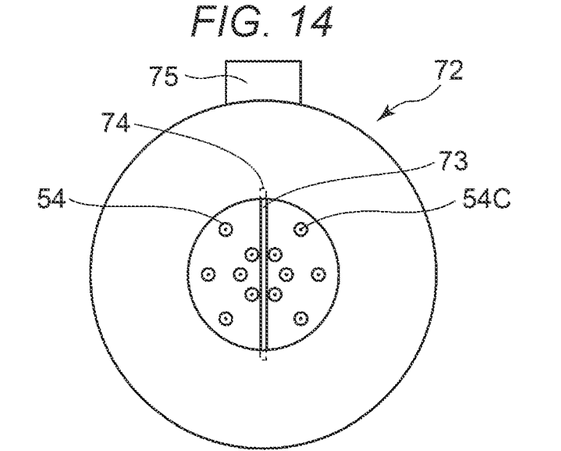
FIG. 14 is a schematic view of the butterfly valve (fully opened).
Figure 15:
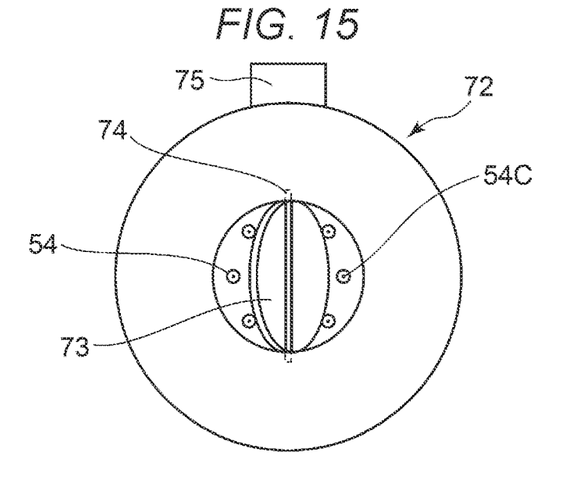
FIG. 15 is a schematic view of the butterfly valve (intermediately opened).

A description will be made on an example of the butterfly valve 72. Each of FIG. 13 to FIG. 15 is a view in which the butterfly valve 72 as the opening regulation valve is attached on the downstream side of the gas fuel supply valve 40 and the butterfly valve 72 is seen from the lower side in the axial direction (the arrow E direction in FIG. 9). The butterfly valve 72 in this example has an electronically-controlled butterfly valve actuator 75, a thin disc-shaped plate 73, and a rod shaft 74 that is coupled to the butterfly valve actuator 75 and is provided in a diameter direction of the thin disc-shaped plate 73. The butterfly valve 72 is configured to have an opening hole, an opening area of which is changed when the thin disc-shaped plate 73 is rotationally driven about the rod shaft 74. In the case of the butterfly valve 72 in this example, the opening area is an area of a portion that is opened when the opening hole is seen in an axial direction (see the arrow E direction in FIG. 9).

FIG. 13 is a view of a case where the opening area of the opening hole is 0%, that is, the opening hole is fully closed. FIG. 14 is a view of a case where the opening area of the opening hole is 100%, that is, the opening hole is fully opened. It is configured that the extended axes 54C of all the gas supply holes 54 pass through the inside of the opening hole. FIG. 15 is a view of a case where the opening area of the opening hole is between 0% and 100% and is approximately 50%. It is configured that approximately half the extended axes 54C of the gas supply holes 54 pass through the inside of the opening hole. Just as described, the butterfly valve actuator 75 can reduce the opening area or can increase the opening area by rotating the thin disc-shaped plate 73. The opening area of the opening hole in the butterfly valve 72 can be changed at least in three stages at a fully closed position, a fully opened position, and a position therebetween or can continuously be changed from 0% to 100%.

The butterfly valve 72 can be formed to be vertically thin due to a structure thereof. Thus, the distance from the gas fuel supply valve 40 to the opening 24 becomes short. When the opening hole is fully opened in the gas fuel combustion mode, the flow of the gas fuel is not blocked between the gas supply holes 54 and the opening 24. Thus, the appropriate amount of the gas fuel can be supplied to the intake supply pipe 20 at the appropriate timing by controlling the gas fuel supply valve 40 without dropping the pressure. In the oil fuel combustion mode, the entry of the intake air into the gas fuel supply valve 40 can be prevented by fully closing the butterfly valve 72.

The electronic control unit 80 is configured to include, for example, a processor such as a central processing unit (CPU) or a micro processing unit (MPU), an electric circuit, and a storage element such as random access memory (RAM) or read only memory (ROM). The electronic control unit 80 may partially or entirely be constructed of a member in which firmware or the like can be updated, or may partially or entirely be a program module or the like that is executed by a command from the CPU or the like.

(Description on Actuation During Switching of Combustion Mode)

A description will be made on actuation of each section during switching of the combustion mode of the engine, which is operable in each of the gas fuel combustion mode and the oil fuel combustion mode. The electronic control unit 80 controls the actuation of each of the sections. In the oil fuel combustion mode, the electronic control unit 80 controls the oil fuel supply system 12 in a manner to bring a supply amount and supply timing of the oil fuel to predetermined target values. The oil fuel, the amount of which is regulated by the oil fuel supply system 12, is supplied to the engine 10. The engine 10 is operated by the combustion of the oil fuel.

When the oil fuel combustion mode is switched to the gas fuel combustion mode, the electronic control unit 80 stops the supply of the oil fuel from the oil fuel supply system 12 and initiates the supply of the gas fuel. A detailed description will be made on the initiation of the supply of the gas fuel. First, the electronic control unit 80 closes the pressure release valve 34 and opens the on-off valve 32. Then, the electronic control unit 80 fully opens the opening hole of the opening regulation valve 60, and subsequently starts controlling the gas fuel supply valve 40 so as to bring a supply amount and supply timing of the gas fuel to predetermined target values.

When the gas fuel combustion mode is switched to the oil fuel combustion mode, the electronic control unit 80 stops the supply of the gas fuel and initiates the supply of the oil fuel. A detailed description will be made on the stop of the supply of the gas fuel. First, the electronic control unit 80 closes the gas fuel supply valve 40 and then fully closes the opening hole of the opening regulation valve 60. Thereafter, the electronic control unit 80 closes the on-off valve 32 and then opens the pressure release valve 34. When the pressure release valve 34 is opened, the pressure in the gas fuel supply valve 40 and the gas fuel supply pipe 38 is dropped. After the pressure drop, the pressure release valve 34 is closed. Thus, the opening hole of the opening regulation valve 60 is fully closed before the pressure in the gas fuel supply valve 40 is dropped.

Just as described above, in the case of switching from the gas fuel combustion mode to the oil fuel combustion mode, the gas fuel supply valve 40 is closed before the pressure in the gas fuel supply valve 40 is dropped. Then, the opening hole of the opening regulation valve 60 is fully closed. Thus, there is no possible entry of the intake air into the gas fuel supply valve 40 and the gas fuel supply pipe 38, and there is no possible corrosion of the gas fuel supply valve 40 and the gas fuel supply pipe 38 by the moisture and the contaminants in the intake air.

(Cooperative Control of Gas Fuel Supply Valve 40 and Opening Regulation Valve 60)

Next, a description will be made on a case where the electronic control unit 80 causes the opening regulation valve 60 to cooperate with the gas fuel supply valve 40 so as to regulate the gas fuel to be supplied to the intake supply pipe 20.

When the gas fuel supply valve 40 is energized, the movable plate 46 is attracted in a direction toward the stator 42 and collides the stopper 56. When the number of the actuation is increased, a colliding portion is possibly worn. When the wear progresses, a stroke of the movable plate 46 is gradually increased (a portion Si in FIG. 2). In this case, the passage for the gas fuel (the clearance 52 in FIG. 3) is increased, and a throttle effect is reduced. As a result, the supply amount of the gas fuel is increased. To handle such a problem, the opening area of the opening hole in the opening regulation valve 60 is reduced to enhance the throttle effect at the time when the gas fuel flows through the opening hole. In this way, the supply amount of the gas fuel can be corrected. Since the opening area of the opening hole in the opening regulation valve 60 can be changed at least in three stages or can continuously be changed, it is possible to appropriately regulate the throttle effect at the time when the gas fuel flows through the opening hole.

The electronic control unit 80 controls the opening hole of the opening regulation valve 60 to be reduced on the basis of the number of the actuation of the movable plate 46. In this way, the electronic control unit 80 can correct the supply amount of the gas fuel. Such control is executed since it is considered that an amount of the wear of the colliding portion is increased with the increase in the number of the actuation of the movable plate 46. For example, a relationship between the number of the actuation of the movable plate 46 and the opening area of the opening hole can be obtained in advance by an experiment or the like and can be stored as a map in a storage device. By entering the number of the actuation of the movable plate 46 to the map, the electronic control unit 80 determines the appropriate opening area of the opening hole and regulates the opening hole to have this opening area.

As another method, the electronic control unit 80 controls the opening hole of the opening regulation valve 60 to be reduced on the basis of an operation time of the gas fuel supply system 30. In this way, the electronic control unit 80 can correct the supply amount of the gas fuel. Such control is executed since it is considered that the number of the collision is increased and the amount of the wear of the colliding portion is increased with elongation of the operation time of the gas fuel supply system 30. For example, a relationship between the operation time of the gas fuel supply system 30 and the opening area of the opening hole can be obtained in advance by an experiment or the like and can be stored in the storage device. By entering the operation time of the gas fuel supply system 30 to the map, the electronic control unit 80 determines the appropriate opening area of the opening hole and regulates the opening hole to have this opening area.

As further another method, the electronic control unit 80 measures a period (Ts) from a time point at which the electromagnetic coil 44 is energized to a time point at which the movable plate 46 collides the stopper 56, and regulates the opening hole on the basis of this period. In this way, the electronic control unit 80 can correct the supply amount of the gas fuel. Such control is executed since, when the period (Ts) is increased, for example, it can be predicted that the stroke amount of the movable plate 46 is increased and the throttle effect of the clearance 52 is reduced.

The period (Ts) from the time point at which the electromagnetic coil 44 is energized to the time point at which the movable plate 46 collides the stopper 56 can be measured by monitoring an energization current to the electromagnetic coil 44, for example. This is because a change point appears to the energization current at the time of the collision of the movable plate 46 against the stopper 56.

For example, a relationship between the period (Ts) from the time point at which the electromagnetic coil 44 is energized to the time point at which the movable plate 46 collides the stopper 56 and the opening area of the opening hole can be obtained in advance by an experiment or the like and can be stored as a map in the storage device. The electronic control unit 80 calculates the period (Ts) by monitoring the energization current to the electromagnetic coil 44 and enters this period (Ts) to the map. In this way, the electronic control unit 80 determines the appropriate opening area of the opening hole and regulates the opening hole to have this opening area.

Just as described, an influence of expansion of the clearance 52 as the passage for the gas fuel on the supply amount of the gas fuel can be corrected by the opening regulation valve 60. In addition, the gas fuel supply system 30 and the electronic control unit 80 are configured to control the supply of the gas fuel on the basis of feedback signals from the engine 10, to which the gas fuel is supplied, and a generator coupled thereto, for example. For example, in the case where the clearance 52 as the passage for the gas fuel is expanded, the amount of the gas fuel to be supplied is increased. Accordingly, a feedback signal for reducing the gas fuel is generated. The electronic control unit 80 that has been received this feedback signal may control the opening area of the opening hole to be reduced to reduce the amount of the gas fuel to be supplied to the engine instead of reducing the amount of the gas fuel by reducing an open period of the gas fuel supply valve 40.

The electronic control unit 80 may be constructed of a single electronic control unit or may be constructed of plural electronic control units. The electronic control unit 80 may determine switching between the gas fuel combustion mode and the oil fuel combustion mode. Alternatively, it may be configured that another electronic control unit determines the switching and the electronic control unit 80 receives the determination result.

The preferred embodiment of the present invention has been described in detail so far with reference to the accompanying drawings. However, the present invention is not limited to such an embodiment. It is obvious that a person who has basic knowledge in the technical field to which the present invention pertains could have easily arrived at various modification examples and application examples that fall within the scope of the technical idea described in the claims. It is understood that those naturally fall within the technical scope of the present invention.

What is claimed is:

1. A gas fuel supply system (30) for supplying gas fuel via an opening (24) of an intake supply pipe (20) that is connected to a combustion chamber in an engine (10) operable in each of a gas fuel combustion mode and an oil fuel combustion mode, the gas fuel supply system (30) comprising:

a gas fuel supply valve (40) for regulating the gas fuel, the gas fuel supply valve (40) having plural gas supply holes (54), from which the gas fuel is fed in a direction toward the opening (24) when the valve is opened; and an opening regulation valve (60) provided between the gas fuel supply valve (40) and the opening (24) and having an opening hole, an opening area of which can be regulated, wherein the gas fuel supply system (30) being configured such that extended axes (54C) of all the gas supply holes (54) pass through the fully opened opening hole.

2. The gas fuel supply system (30) according to claim 1, wherein the opening area of the opening hole can be regulated at least in three stages at a fully closed position, a fully opened position, and a position therebetween.

3. The gas fuel supply system (30) according to claim 1, wherein the opening regulation valve (60) is any of an iris valve (64), a slide valve (68), and a butterfly valve (72).

4. The gas fuel supply system (30) according to claim 1, wherein the opening regulation valve (60) cooperates with the gas fuel supply valve (40) to regulates an amount of the gas fuel to be supplied to the opening (24).

5. The gas fuel supply system (30) according to claim 1, wherein when the engine (10) is switched from the gas fuel combustion mode to the oil fuel combustion mode, the gas fuel supply valve (40) is first closed, and then the opening hole of the opening regulation valve (60) is fully closed.

6. The gas fuel supply system (30) according to claim 2, wherein the opening regulation valve (60) is any of an iris valve (64), a slide valve (68), and a butterfly valve (72).

7. The gas fuel supply system (30) according to claim 6, wherein the opening regulation valve (60) cooperates with the gas fuel supply valve (40) to regulates an amount of the gas fuel to be supplied to the opening (24).

8. The gas fuel supply system (30) according to claim 7, wherein when the engine (10) is switched from the gas fuel combustion mode to the oil fuel combustion mode, the gas fuel supply valve (40) is first closed, and then the opening hole of the opening regulation valve (60) is fully closed.

\* \* \* \* \*